US012117144B2

(12) United States Patent
Li et al.

(10) Patent No.: US 12,117,144 B2
(45) Date of Patent: Oct. 15, 2024

(54) LAMP ASSEMBLY AND METHOD FOR ASSEMBLING LAMP

(71) Applicant: LEDVANCE GmbH, Garching bei Munchen (DE)

(72) Inventors: Zhian Li, Shenzhen Guangdong (CN); Armin Konrad, Großaitingen (DE); Shijun Nie, Garching (DE); Tianci Zeng, Shenzhen Guangdong (CN)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 18/369,362

(22) Filed: Sep. 18, 2023

(65) Prior Publication Data

US 2024/0093859 A1 Mar. 21, 2024

(30) Foreign Application Priority Data

Sep. 21, 2022 (CN) ......................... 202211149919.8

(51) Int. Cl.

| | |
|---|---|
| ***F21V 23/00*** | (2015.01) |
| ***F21V 17/06*** | (2006.01) |
| ***F21V 19/00*** | (2006.01) |
| ***F21V 19/04*** | (2006.01) |
| *F21Y 115/10* | (2016.01) |

(52) U.S. Cl.

CPC ............ *F21V 17/06* (2013.01); *F21V 19/008* (2013.01); *F21V 19/04* (2013.01); *F21V 23/005* (2013.01); *F21Y 2115/10* (2016.08)

(58) Field of Classification Search

CPC ........ F21V 17/06; F21V 19/008; F21V 19/04; F21V 23/005; F21Y 2115/10

See application file for complete search history.

(56) References Cited

U.S. PATENT DOCUMENTS

| | | | | |
|---|---|---|---|---|
| 2006/0049368 | A1* | 3/2006 | Culbert | A61L 9/20 250/503.1 |
| 2015/0070882 | A1* | 3/2015 | Ohno | F21S 4/28 362/219 |
| 2015/0362132 | A1* | 12/2015 | McCane | F21K 9/90 362/249.02 |
| 2016/0131341 | A1* | 5/2016 | May | F21V 5/04 362/218 |
| 2016/0327216 | A1* | 11/2016 | Gielen | F21V 23/0457 |
| 2018/0274734 | A1* | 9/2018 | Cerce | F21S 8/00 |
| 2019/0056073 | A1* | 2/2019 | Ulloa | F21K 9/278 |
| 2020/0041103 | A1* | 2/2020 | Germain | F21S 2/00 |

* cited by examiner

*Primary Examiner* — Evan P Dzierzynski

(74) *Attorney, Agent, or Firm* — Hayes Soloway PC

(57) ABSTRACT

Provided is a lamp assembly including a lamp main body. The lamp assembly includes at least one light engine, and at least one first connector for electrically connecting the at least one light engine to a power supply and mechanically fixing the last light engine to the lamp main body. The at least one first connector is configured to separably mount the at least one light engine to the lamp main body. In addition, a method for assembling a lamp is also provided.

20 Claims, 12 Drawing Sheets

LAMP ASSEMBLY AND METHOD FOR ASSEMBLING LAMP

CROSS-REFERENCE TO RELATED APPLICATIONS

This patent application claims the benefit of and priority to Chinese Patent Application No. 202211149919.8, filed with the China National Intellectual Property Administration on Sep. 21, 2022, which is herein incorporated by reference in its entirety.

FIELD OF THE DISCLOSURE

The present disclosure generally relates to the technical field of lamps, in particular to a lamp assembly, and a method for assembling a lamp.

BACKGROUND

In view of environmental challenges, such as the shortage of raw materials and resources, the compatibility between lamps and circular economy becomes more and more important. For example, in the case of upgrading or repairing a lamp, an end user is encouraged to replace components or assemblies of the lamp instead of the whole lamp. However, the replacement of certain components of the lamp may require tools and special technical knowledge that may not be available to the end user.

SUMMARY

An objective of the present disclosure is to provide a lamp assembly that allows an end user to easily replace components of a lamp without special equipment or tools.

According to a first aspect, a lamp assembly is provided. The lamp assembly includes a lamp main body or a housing, and at least one light engine, in particular a light-emitting diode (LED) light engine. The lamp main body may also be configured to receive other portions of the lamp, e.g., an electrical driver for driving at least one light engine or some driving components.

The lamp assembly further includes at least one first connector for electrically connecting at least one light engine to a power supply and mechanically fixing the at least one light engine to the lamp main body. The at least one first connector is configured to detachably mount the at least one light engine to the lamp main body. In particular, the at least one connector may be configured such that the at least one light engine can be easily connected to, or disconnected from, the lamp main body without the use of any special equipment or tool, such as a screwdriver, pliers, or others. Due to the detachable mounting of the at least one light engine, the end user can easily replace the light engine for upgrading or repairing the lamp.

The at least one first connector may include at least one electromechanical connector for electrically connecting and mechanically mounting the at least one light engine to the lamp main body. Thus, the electromechanical connector may be used to electrically and mechanically connect the at least one light engine to the lamp main body. The combination of these two functions in one connector makes it particularly easy for the end user to mount, dismount and/or replace at least one light engine when required.

The at least one light engine may include a first end having at least one electrical contact, and the at least one electromechanical connector may be configured to receive the first end of the at least one light engine. By inserting the first end of the at least one light engine into one electromechanical connector, at least one light engine can be easily mounted on the lamp main body. Therefore, the at least one electromechanical connector provides electric and mechanical connections of the at least one light engine.

In some embodiments, the electromechanical connector is configured such that an electromechanical connection is established by inserting the first end of the at least one light engine into the at least one electromechanical connector in a predetermined direction and in a substantially linear translational movement with respect to the at least one electromechanical connector. The light engine is inserted by moving the at least one light engine in the predetermined direction, it is particularly easy to provide electrical and mechanical connections for the at least one light engine without any tools.

The at least one connector may further include at least one second connector for fixing the at least one light engine to a mounting position. The at least one second connector may be configured as a mechanical connector for reliably fixing the at least one light engine to the mounting position without the need of any special means of fixing, such as screws or the like.

The at least one light engine may include a second end, especially a second end opposite to the first end, and the at least one second connector may be configured to receive the second end of the at least one light engine. In particular, the at least one second connector may be configured such that the second end of the at least one light engine may be received by the at least one second connector after the first end of the at least one light engine is inserted into the at least one electromechanical connector. In this way, the at least one light engine can be fixed at both ends thereof, thus providing a particularly reliable fixing of the at least one light engine to the lamp main body.

The at least one second connector may include a manually movable locking mechanism for manually locking and unlocking the at least one mechanical connector. In particular, due to the locking mechanism, the at least one light engine can be locked manually by bringing the locking mechanism to a locking position, and thus the at least one light engine is fixed and prevented from falling out. In particular, after inserting the first end of the at least one light engine into the at least one first connector and connecting the second end of the at least one light engine into the at least one second connector, the mechanical connector may be manually locked by a user, and thus the second end of the at least one light engine can be locked in the mechanical connector. To replace or remove the at least one light engine, the user can manually unlock the locking mechanism or bring the locking mechanism to an unlocking position.

The locking mechanism may include a sliding latch. The sliding latch is configured to lock and unlock the second end of the at least one light engine, which depends on a position of the sliding latch. By sliding the sliding latch with a finger, the user can easily lock or unlock at least one light engine when needed.

The at least one light engine may be configured as a linear module, including multiple LEDs and an elongated printed circuit board (PCB) with conductive wires. The multiple LEDs are mounted on the printed circuit board, and at least one end of the elongated printed circuit board is configured to be inserted into at least one first connector. By inserting the PCB into the electrochemical connector, electrical and chemical connections of the at least one light engine can also be established.

In some embodiments, the lamp assembly includes a cover, in particular a translucent, at least partially translucent, transparent and/or optically diffusive cover, and an openable frame structure for mounting the translucent cover, thus enabling the translucent cover to be openable and closeable, in particular without the need of any tools or screws. In particular, the openable frame structure may be configured such that the user can easily and safely open the cover to enter the interior of the lamp without using tools, thereby dismounting or replacing the at least one light engine, a driver or any other components inside the lamp. In some embodiments, the cover is a portion of the openable frame structure. In this case, the openable frame structure and the cover may be mounted together.

According to a second aspect, a method for assembling a lamp is also provided. In particular, the lamp can be configured substantially in accordance with the first aspect of the present disclosure.

According to the method, a lamp main body or a housing is provided, which is configured to receive at least one light engine. The lamp main body may further be configured to receive other portions of the lamp, e.g., a driver for driving the at least one light engine, or a portion of the driver.

The method further includes: providing at least one light engine for being mounted on a lamp main body, especially in a housing; providing at least one first connector for electrically connecting the at least one light engine to a power supply and mechanically mounting the at least one light engine on the lamp main body. The at least one first connector is configured to detachably mount the at least one light engine on the lamp main body. In particular, the at least one first connector may be configured such that the at least one light engine may be easily connected to or disconnected from the lamp main body without the use of any special equipment or tool, such as a screwdriver, pliers, or others.

The method further includes: detachably mounting the at least one light engine to the lamp main body using the at least one first connector. Therefore, an end user can easily replace the light engine as needed, such as upgrading or repairing the lamp.

In the following description, details are provided to describe embodiments of the present specification. However, it should be apparent to those skilled in the art that the present disclosure may be practiced without such details.

Certain portions of the this embodiment have similar components. Similar components may have the same name or similar component number. The description of one component is applicable by reference to another similar component, thereby reducing repetition of text without limiting the disclosure.

DETAILED DESCRIPTION

Figure 1:
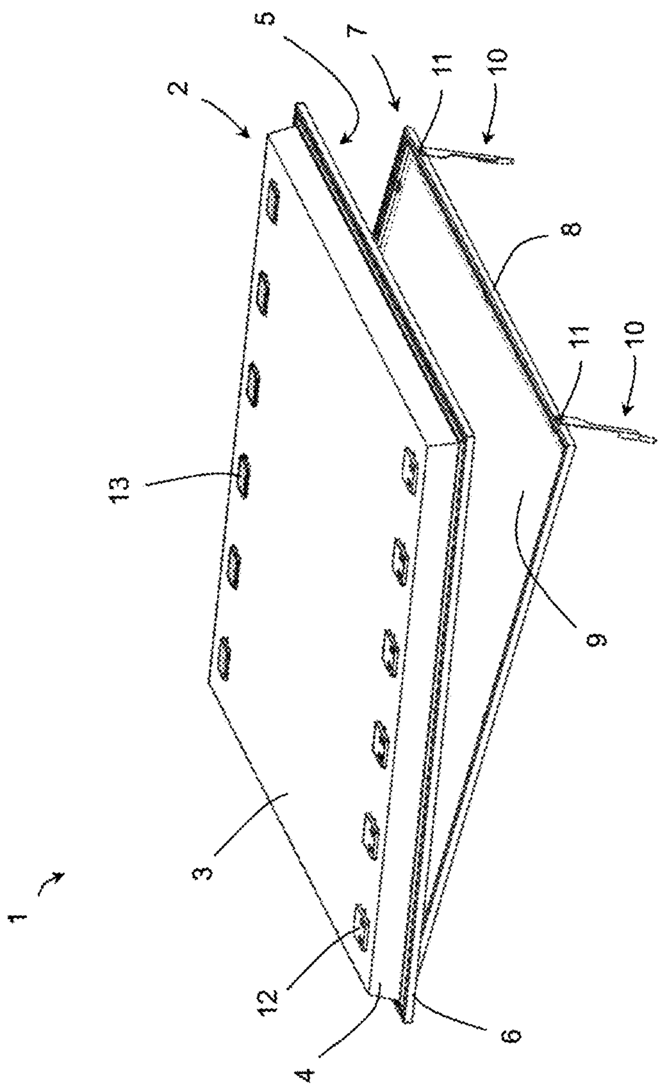
FIG. 1 shows a perspective view of a lamp assembly according to one embodiment in a slightly open state.

FIG. 1 shows a perspective view of a lamp assembly according to one embodiment in a slightly open state. In the embodiment of FIG. 1, the lamp assembly 1 is equivalent to a panel lamp, including a substantially rectangular lamp main body 2 or a housing. The lamp main body 2 has a bottom 3, a side wall 4 extends from the bottom 3 to an opening 5 opposite to the bottom 3, and the opening 5 is surrounded by a flange 6 or a main body frame. The lamp assembly 1 further includes an openable frame structure 7 which has a frame 8 or a front frame, and a cover 9 connected to the frame 8. The openable frame structure 7 includes a clip 10 which can be rotationally fixed to the frame 8 by a rivet 11. The cover 9 is made of a translucent material, such that light generated by the at least one light engine can pass through the cover 9.

The lamp assembly further includes a number of first connectors 12 and a number of second connectors 13 connected to the bottom 3 of the lamp main body 2. In the view of FIG. 1, the first connectors 12 and the second connectors 13 are partially seen from a rear side of the lamp assembly 1.

Figure 2:
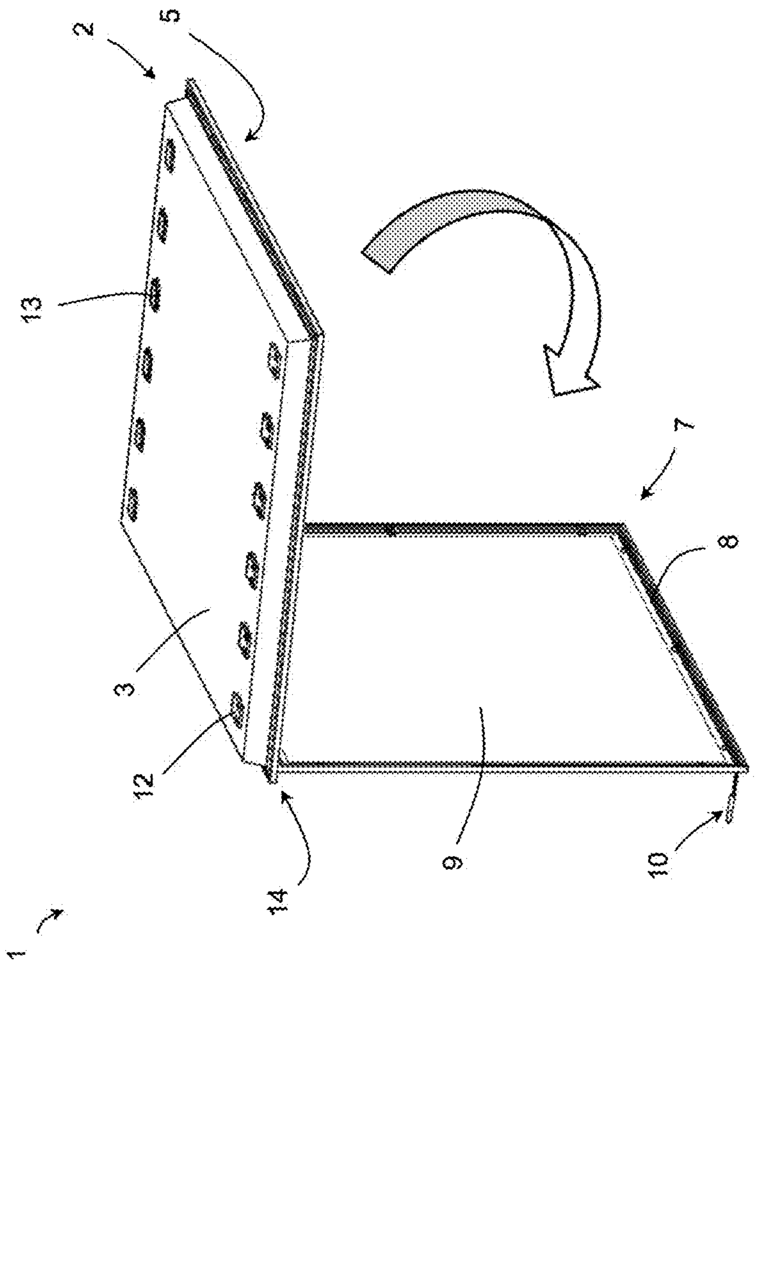
FIG. 2 shows a perspective view of a lamp assembly of FIG. 1 in a wide open state.

FIG. 2 shows a perspective view of a lamp assembly of FIG. 1 in a wide open state. In the open state of the lamp assembly 1 of FIG. 2, the frame 8 with the translucent cover 9 is in a substantially vertical position, or perpendicular to the bottom 3 of the lamp main body 2. The lamp assembly 1 includes a hinge structure 14 for opening and closing the cover 9 by rotating the frame 8 to be relative to the flange 6 pivoted by the hinge structure 14. An arc arrow in FIG. 1 indicates a rotation direction of the frame 8 and the cover 9 relative to the flange 6 when the lamp assembly 1 is opened.

Figure 3:
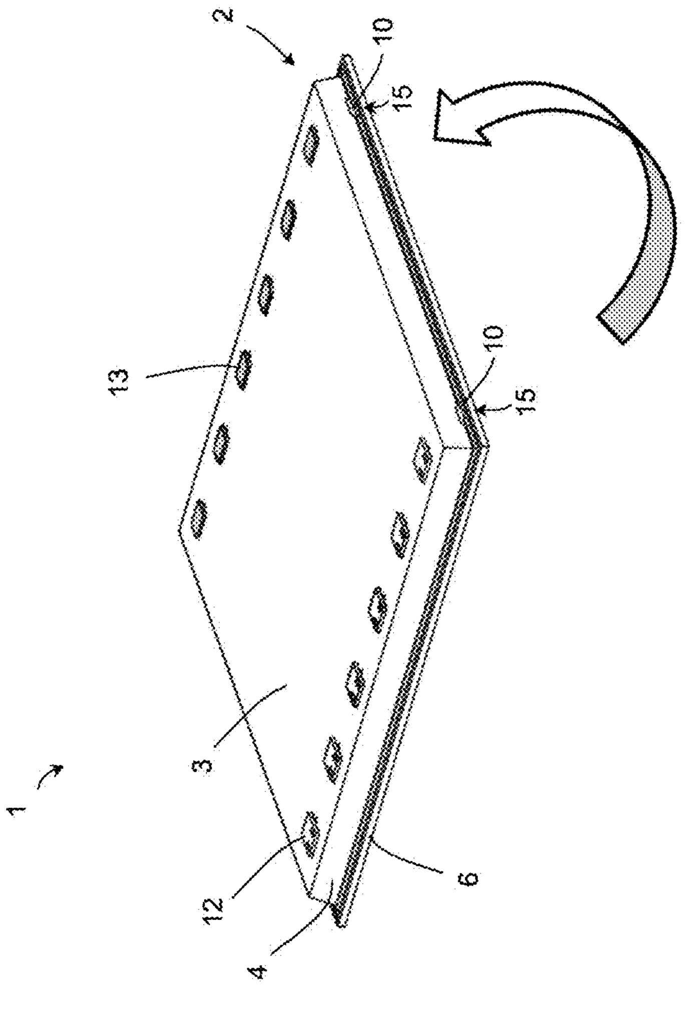
FIG. 3 shows a perspective view of a lamp assembly of FIG. 1 in a closed state.

FIG. 3 shows a perspective view of a lamp assembly of FIG. 1 in a closed state. In a state shown in FIG. 3, after the cover 9 is closed, the clip 10 has been rotated about the rivet 11 to a locking position, and thus the clip 10 can be engaged with an opening 15 of the flange 6.

Figure 4:
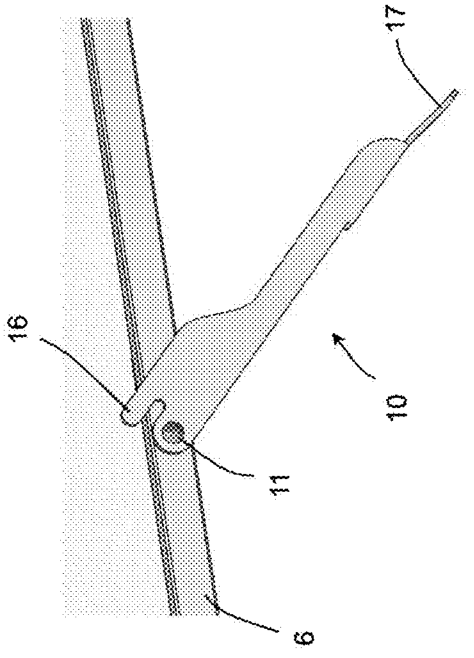
FIG. 4 shows a perspective detail view of a lamp assembly of FIG. 1 in an open state.

FIG. 4 shows a perspective detail view of a lamp assembly of FIG. 1 in an open state. In particular, it shows an enlarged view of a clip 10 which is rotationally connected to the frame 8 of the openable frame structure 7 by means of the rivet 11. The clip 10 includes a projection 16 for being engaged with an opening 15 in the flange 6 and a grip 17 for manually opening and closing the clip 10.

Figure 5:
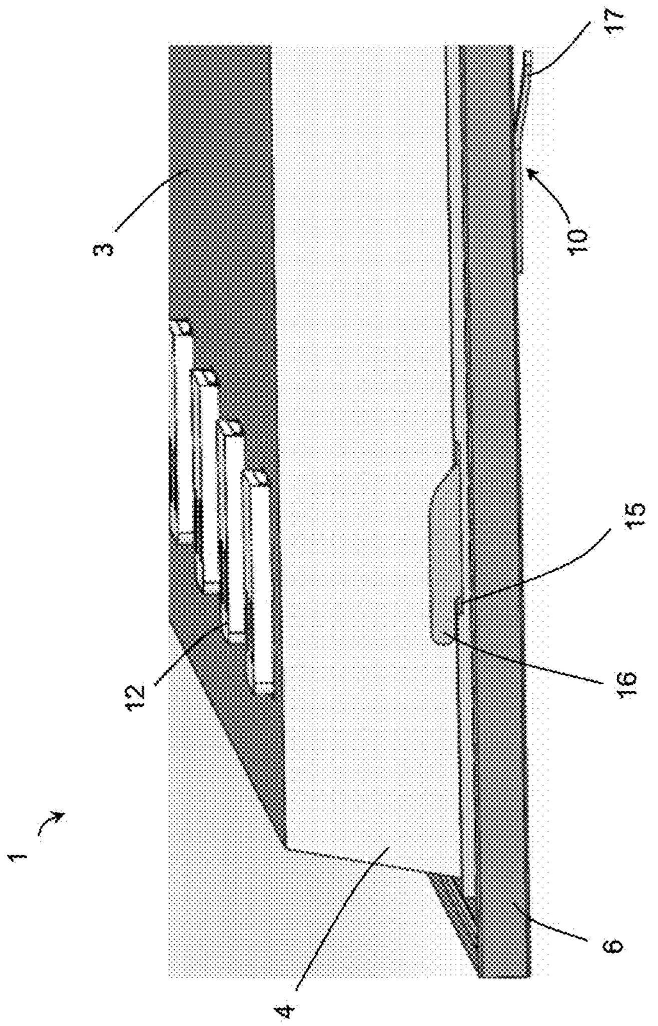
FIG. 5 shows a perspective detail view of a lamp assembly of FIG. 1 in a closed state.

FIG. 5 shows a perspective detail view of a lamp assembly of FIG. 1 in a closed state. In particular, FIG. 5 shows an engagement situation of the clip 10 and the flange 6 in the closed state of the lamp assembly 1, in which the projection 16 of the clip 10 is engaged with the opening 15 of the flange 6. As can be seen from the view of FIG. 5, the grip 17 of the clip 10 is curved and far away from a surface of the flange 6, and thus the end user can easily grasp the grip to open the clip 10.

Figure 6:
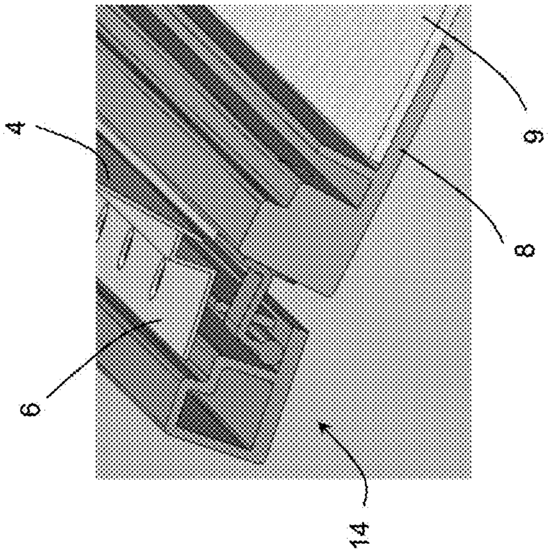
FIG. 6 shows a perspective detail view of a lamp assembly of FIG. 1 in section.

FIG. 6 shows a perspective detail view of a lamp assembly of FIG. 1 in section. In the view of FIG. 6, a hinge structure 14 of the openable frame structure can be particularly clearly seen. The hinge structure 14 is connected to the flange 6 of the lamp main body 2 and is configured such that the frame 8 and the translucent cover 9 can be easily rotated together, so as to open and close the cover 9.

Figure 7:
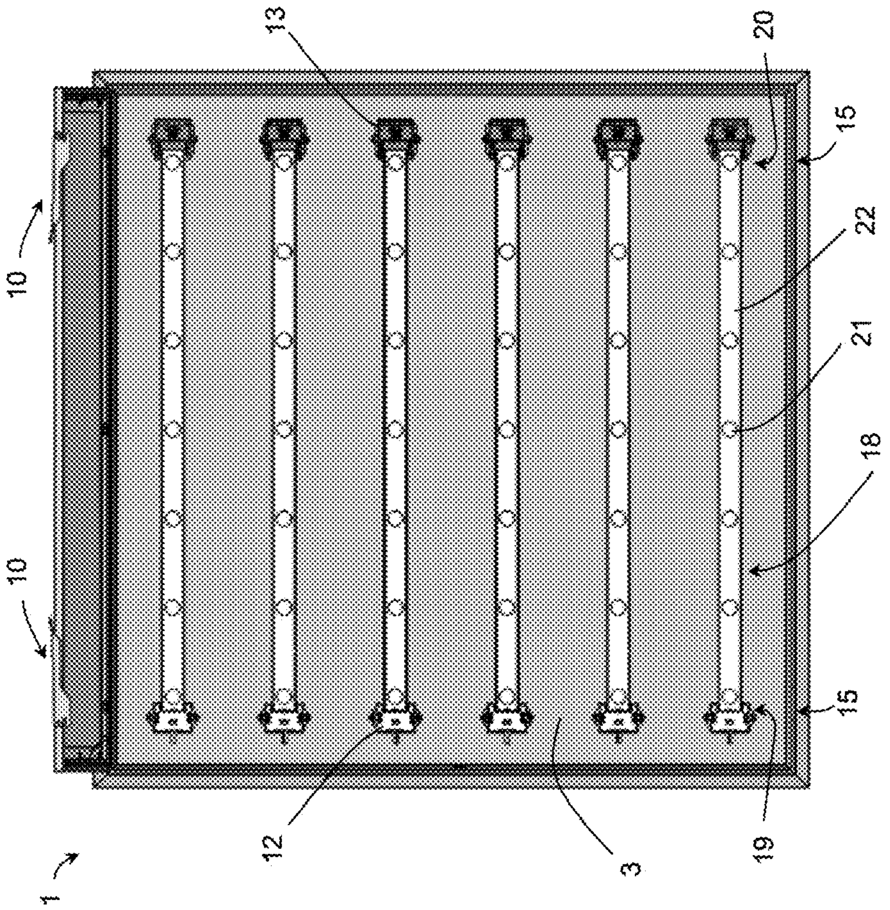
FIG. 7 shows a bottom view of a lamp assembly of FIG. 1 in an open state.

FIG. 7 shows a bottom view of a lamp assembly of FIG. 1 in an open state. In the bottom view of FIG. 7, a light engine 18 mounted on a bottom 4 of the lamp main body 2 can be seen. In this embodiment, the light engine 18 is configured as a linear light engine having an elongated, in particular substantially rectangular main body, and having a first end 19 and a second end 20 opposite to the first end. The first end 19 of the light engine 18 is connected to a first connector 12, and the second end 20 of the light engine 18 is connected to a second connector 13.

In this embodiment, the light engine 18 is an LED light engine, including multiple LEDs 21 arranged on a printed circuit board (PCB) 22.

Figure 8:
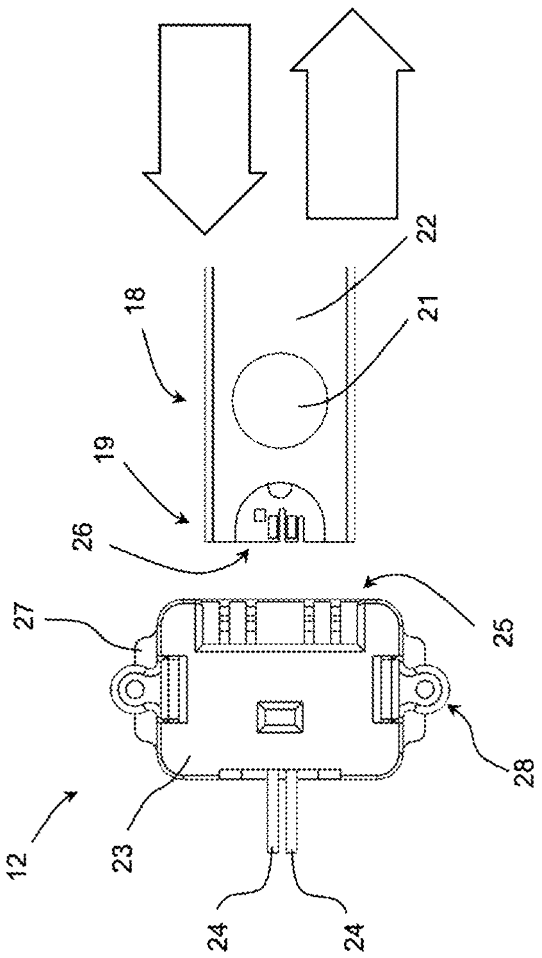
FIG. 8 shows a connection of a first connector and a light engine according to one embodiment.

FIG. 8 illustrates a connection of a first connector and a light engine according to one embodiment. In this embodiment, the first connector 12 is configured as an electromechanical connector, which is configured to electrically connect and mechanically mount the light engine 18 to the lamp main body 2. In particular, the first connector 12 includes a housing 23, a pin 24 for connecting the first connector 12 to a power supply, and an electromechanical interface 25 for coupling the first connector 12 to an electromechanical interface 26 of the light engine 18. In this embodiment, the electromechanical interface 25 of the first connector 12 is configured as a socket, while the electromechanical interface 26 formed at the first end 19 of the light engine 18 is configured as a plug.

In order to mount the light engine 18 on the lamp main body 2, the first end 19 (configured as a plug) of the light engine 18 with the electromechanical interface 25 can be inserted into the electromechanical interface 25 of the first connector 12, so as to be configured as a socket. Insertion of the first end 19 of the light engine 18 into the first connector 12 may be completed through a linear translational movement of the light engine 18, particularly along a longitudinal axis of the light engine, as shown by an upper wide arrow in FIG. 8. Conversely, the first end 19 of the light engine 18 may be disconnected or pulled from the first connector 12 by pulling the light engine 18 or making the light engine 18 away from the first connector 12, i.e., in an opposite direction, as shown by a down arrow in FIG. 8.

The housing 23 includes a mounting bracket 27 for being engaged with a corresponding opening at the bottom 3 of the lamp main body 2, and a fixing element 28 for fixing the first connector to the bottom 3 of the lamp main body 2. After the first connector 12 is mounted through the mounting bracket 27, a position of the first connector 12 can be fixed by the fixing element 28. The fixing element 28 may include a spring or an elastic component, which is configured to release the bracket 27 when pressed by a user. In some embodiments, the fixing element 28 may also be configured as a bolt hole or a screw hole, such that the first connector 12 may be, in particular, additionally screwed to the bottom 3 of the lamp main body 2 for more reliable fixing.

Figure 9:
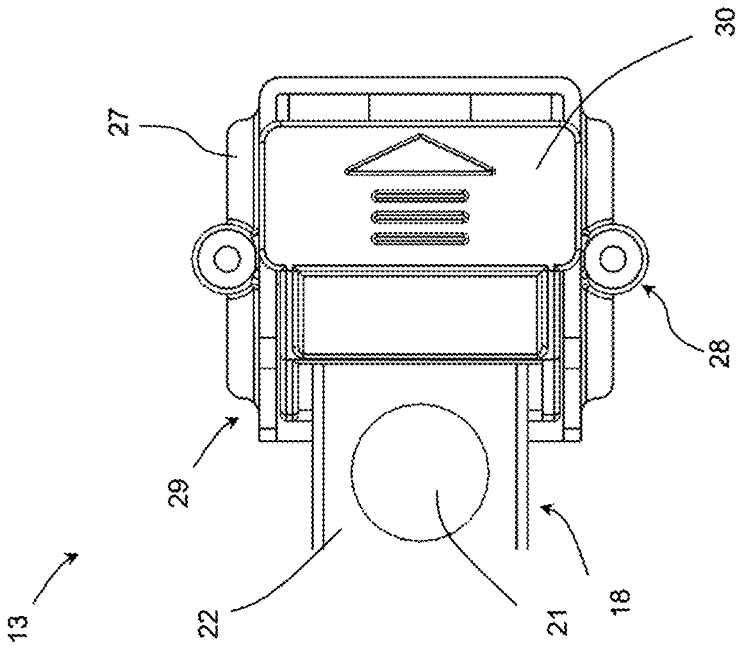
FIG. 9 illustrates a connection of a second connector and a light engine according to one embodiment in a locked state.

FIG. 9 illustrates a connection of a second connector and a light engine according to one embodiment in a locked state. In this embodiment, the second connector 13 is configured as a mechanical connector, which is configured to mechanically mount the light engine 18 to the lamp main body 2. The second connector 13 includes a housing 29 configured to receive the second end 20 of the light engine 18, and a locking mechanism with a movable lock catch 30 for locking or unlocking the second end 20 of the light engine 18 in the second connector. In the embodiment of FIG. 9, the movable lock catch 30 is configured as a sliding lock catch, which can be easily displaced to lock or unlock the second connector. The housing 29 of the second connector 13 further includes a mounting bracket 27 for engaging the connector with a corresponding opening at the bottom 3 of the lamp main body 2, and a fixing element 28 for fixing the first connector to the bottom 3 of the lamp main body 2. In this embodiment, the fixing element 28 is similar to the fixing element of the first connector. In some embodiments, the fixing element 28 may also be alternatively or additionally configured as a bolt hole or a screw hole, such that the second connector 13 can be fixedly screwed to the bottom 3 of the lamp main body 2, in particular after the second connector 12 is mounted through the mounting bracket 27. By sliding the sliding latch on the second end 20 of the light engine 18 against the above arrow, the light engine can be fixed to prevent the light engine from moving along its longitudinal axis.

Thus, once the second end of the light engine 18 is locked into the second connector 13, the light engine 18 is fixed to prevent the light engine from translating with respect to the first connector 12, and thus the light engine cannot easily drop from its mounting position. In order to unlock the second connector 13, the locking mechanism can be opened by moving the movable lock catch 30 or the sliding latch along an arrow provided at the top of the sliding latch, where the arrow indicates a sliding direction of opening the sliding latch.

Figure 10:
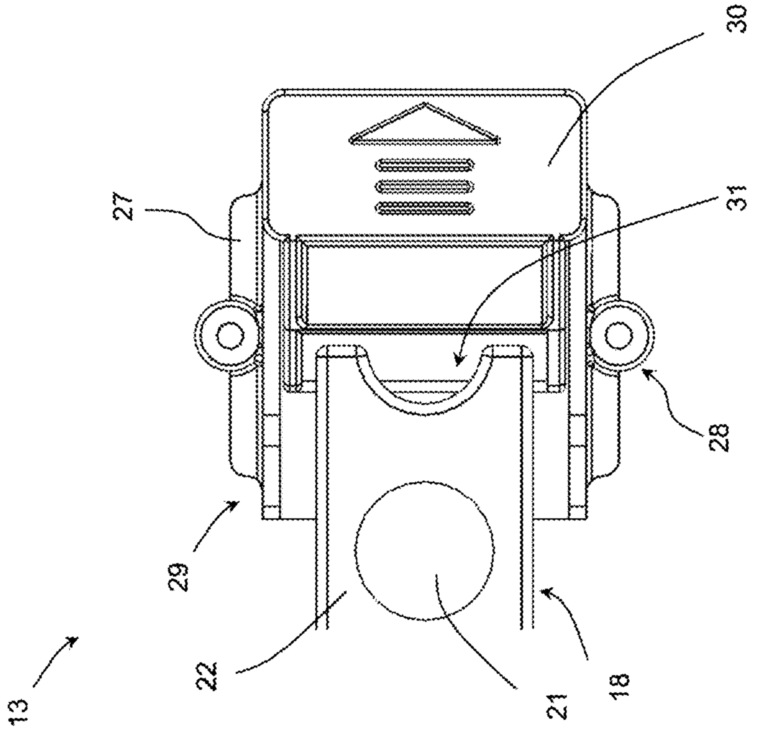
FIG. 10 illustrates a connection of a second connector and a light engine according to one embodiment in an unlocked state.

FIG. 10 illustrates a connection of a second connector and a light engine according to one embodiment in an unlocked state. In the unlocked state shown in FIG. 10, the sliding lock catch has been moved rightwards, i.e., away from the light engine 18, and thus the second end 20 of the light engine 18 can be released from the housing 29 of the second connector 13. In particular, once the movable lock catch 30 or the sliding lock catch is moved aside, the user can grasp the second end 20 of the light engine 18 at a groove 31 with a finger and pull the second end 20 of the light engine 18 out of the housing 29 of the second connector 13 by slightly bending the light engine 18, in particular, the PCB 22 is enabled to be away from the bottom 3 of the lamp main body 2.

Once the second end 20 of the light engine 18 is released from the housing 29 of the second connector 13, the light engine 18 can enter a translational movement away from the first connector 12. In this manner, the light engine 18 can be easily separated or disconnected from the first connector 12 and removed from the lamp.

Figure 11:
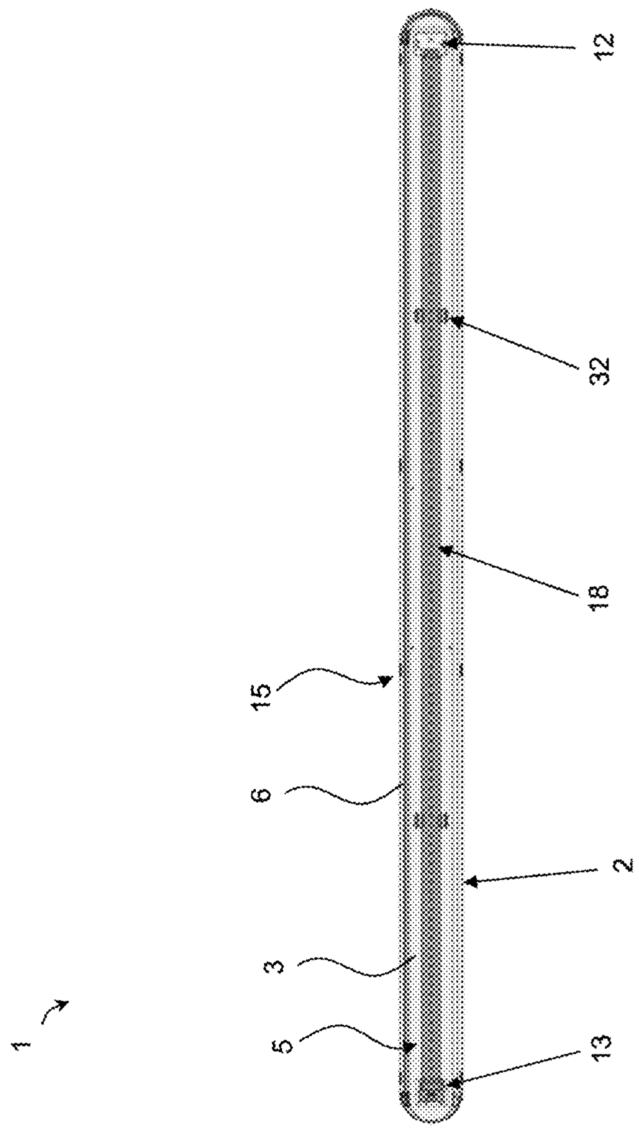
FIG. 11 shows a bottom view of a lamp assembly according to another embodiment.

FIG. 11 shows a bottom view of a lamp assembly according to another embodiment. In particular, FIG. 11 shows a lamp assembly 1 of a strip-shaped lamp, including a strip-shaped lamp main body 2 with a bottom 3, and a flange 6 surrounding an opening 5 opposite to the bottom 3. The flange 6 is provided with an opening 15 for receiving the projection 16 of the clip 10 for fixing the cover 9 (not shown).

In this embodiment, the lamp assembly includes a single light engine 18 in the form of a linear module, which is similar to that shown above in FIG. 7. The light engine is configured as a 4-feet light engine for an SELV (Safe Ultra Low Voltage) operation, The light engine is provided with three independent circuits has no lenses. The light engine 18 is fixed by the first connector 12 at its first end 19, and is fixed by the second connector 13 at its second end 20. In addition to the first connector 12 and the second connector 13, according to FIG. 11, the lamp assembly 1 further includes a manually releasable clip 32 between the first connector 12 and the second connector 13 for fixing a middle portion of the light engine 18 to the bottom 3 of the lamp main body 2. In particular, in the case of a particularly long light engine 18, the releasable clip 32 can improve the connection between the light engine 18 and the bottom 3 of the lamp main body 2, and the connection between the light engine and the bottom of the lamp main body can be easily opened if the user needs to remove or replace the light engine 18. The clip may include a spring or an elastic deformation element, such that the light engine can be clamped out by the elastic element of the elastic deformation clip 32.

In some embodiments, the lamp assembly 1 is configured such that the first connector 12, the second connector 13 and/or the clip 32 can be arranged at different positions of the bottom 3 of the lamp main body 2. In particular, the bottom 3 of the lamp main body 2 may include multiple openings or grooves for being engaged with the mounting bracket 27 of the first connector 12, the second connector 13 and/or the clip 32, and thus one or more of these elements can be fixed to different positions of the bottom 3. In some embodiments, the bottom 3 of the lamp main body 2 includes an elongated groove or track for being engaged with the mounting bracket 27 of the first connector 12, the second connector 13 and/or the clip 32, and thus these elements can be moved to the desired position along the groove or track. Once these elements are moved to the desired position, particularly with a specific dimension of the light engine, these elements can be fixed by the fixing element 28. In addition, the fixing element 28 may be configured as a spring element. Therefore, the mounting bracket 27 can be released from a joint with the opening at the bottom 3 by pressing the fixing element towards the bottom 3 of the lamp main body, and the first connector 12, the second connector 13 and/or the clip 32 can be easily fixed, replaced or removed if necessary.

Through the above lamp assembly, a lamp, such as a panel lamp or a backlight panel, a linear lamp or other types of lamps, can be easily assembled and dismounted. In addition, the cover can be easily opened to gain access to the interior of the lamp, and the light engine can be easily removed or replaced. In addition, the lamp based on such a lamp assembly is also easy to manufacture.

Figure 12:
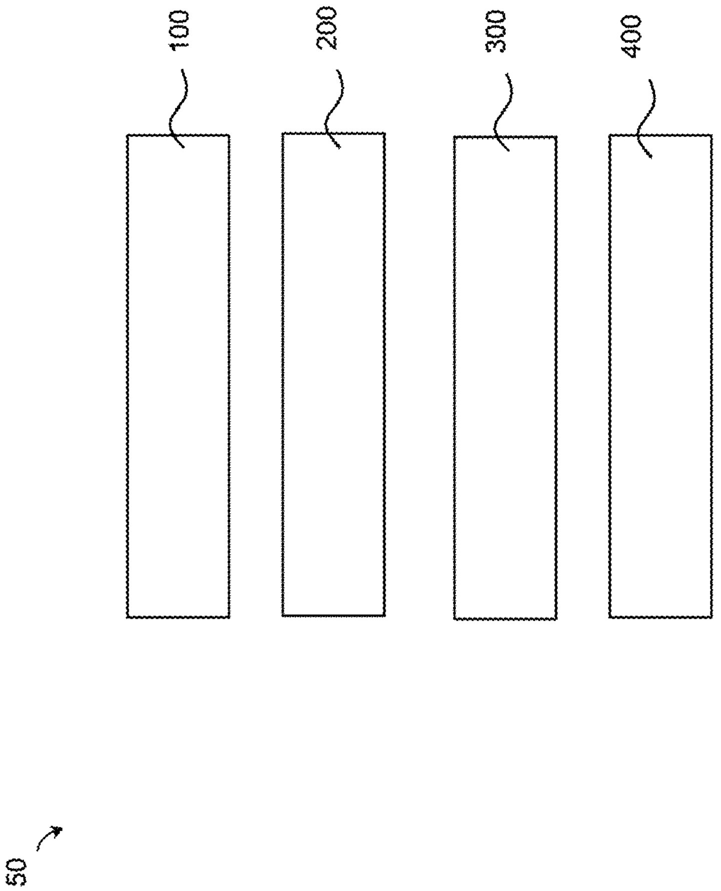
FIG. 12 shows a flow chart of a method for assembling a lamp according to one embodiment.

FIG. 12 shows a flow chart of a method for assembling a lamp according to one embodiment. In order to manufacture the lamp, in a first step 100, a lamp main body or a housing for receiving at least one light engine is provided. The lamp main body may be configured to receive multiple light engines. The lamp main body may include a bottom, a side wall, and an opening, particularly opposite to the bottom. In Step 200, at least one light engine for being mounted on the lamp main body is provided. The at least one light engine may in particular include multiple light engines, such as linear light engines, particularly as described in the above embodiments according to the first aspect.

In Step 300, at least one first connector is provided to electrically connect the at least one light engine to a power supply and mechanically fix the at least one light engine to the lamp main body. The at least one first connector is configured to detachably mount the at least one light engine to the lamp main body. The at least one first connector may be configured in particular according to the first aspect as described in the above embodiment. In Step 400, the at least one light engine is connected to the lamp main body through at least one first connector.

In some embodiments, the method may include: providing an openable frame structure that may be mounted on the lamp main body. The openable frame structure may include a frame for mounting the cover, and thus the lamp can be easily closed or opened, for example, the user can touch and replace the light engine without any additional tools. As shown in FIG. 3, after the cover is closed, a clip 10 can be rotated about the rivet 11 to a locking position, and thus the clip 10 can be engaged with an opening 15 of a flange 6, and the cover is fixed to a closing position.

The method may further include: providing at least one second connector for mechanically fixing the at least one light engine to the lamp main body. In some embodiments, the at least one light engine is fixed by the first connector at its first end 19, and is fixed by a second connector at its second end 20. In some embodiments, a releasable clip is provided for fixing the at least one light engine in an area between the first end and the second end.

According to the method, the assembly of lamps (e.g., backlight lamps, linear lamps or similar lamps) does not require any instruments, screws or glue, and the tool-free and simple assembly can be achieved.

Although at least one exemplary embodiment has been described in the foregoing detailed description, it should be understood that there are numerous variations. It should also be understood that the exemplary embodiments or demonstrative embodiments are only examples and are not intended in any way to limit the scope, applicability or configuration of the present disclosure. On the contrary, the above detailed description will provide a convenient route map for those skilled in the art, so as to achieve exemplary embodiments or demonstrative embodiments.

What is claimed is:

1. A lamp assembly comprising:

a lamp main body;

at least one first connector comprising an electromechanical connector configured for receiving a first end of at least one light engine to effectuate both:

electrical connection of the at least one light engine to a power supply; and mechanical fixing of the first end of the at least one light engine to the lamp main body, wherein the at least one first connector is configured to detachably mount the at least one light engine to the lamp main body; and at least one second connector configured for receiving a second end of the at least one light engine to effectuate mechanical fixing of the at least one light engine to the lamp main body, wherein the at least one second connector is not configured for electrical connection, and wherein the at least one second connector is configured for adjustment in a direction extending along a longitudinal length of the at least one light engine between:

an unlocked state in which the at least one light engine is engageable and disengageable with respect to the at least one second connector; and a locked state in which the at least one light engine is prevented from engagement and disengagement with respect to the at least one second connector.

2. The lamp assembly according to claim 1, wherein the at least one second connector comprises a locking mechanism configured for at least one of manually locking and manually unlocking the at least one second connector.

3. The lamp assembly according to claim 2, wherein the locking mechanism comprises a sliding latch configured to lock and unlock the second end of the at least one light engine according to a position of the sliding latch.

4. The lamp assembly according to claim 1, wherein the at least one light engine is configured as a linear module comprising:
- a plurality of light-emitting diodes (LEDs); and
- an elongated printed circuit board with a conductive wire, wherein:
  - the plurality of LEDs is mounted on the printed circuit board; and
  - the elongated printed circuit board is configured to be inserted into the electromechanical connector of the at least one first connector and received by the at least one second connector.

5. The lamp assembly according to claim 1, wherein the lamp assembly further comprises:
- a translucent cover; and
- an openable frame structure configured for mounting the cover and enabling the translucent cover to be opened and closed.

6. The lamp assembly according to claim 1, wherein:
- the electromechanical connector is configured as a socket; and
- the first end of the at least one light engine is configured as a plug configured to be received by the electromechanical connector.

7. The lamp assembly according to claim 1, wherein the at least one first connector further comprises a first fixing element configured for fixing the at least one first connector to the lamp main body.

8. The lamp assembly according to claim 7, wherein the at least one second connector further comprises a second fixing element configured for fixing the at least one second connector to the lamp main body.

9. The lamp assembly according to claim 8, wherein at least one of the first fixing element and the second fixing element comprises at least one of a spring and an elastic component.

10. The lamp assembly according to claim 1, wherein the at least one first connector and the at least one second connector are configured such that, once the second end of the at least one light engine is released from the at least one second connector, the at least one light engine is separable from the at least one first connector in a linear direction extending away from a direction of insertion of the first end into the at least one first connector.

11. The lamp assembly according to claim 1, wherein in being configured for manually locking the at least one second connector, the at least one light engine is fixed to prevent translational and rotational movement thereof.

12. The lamp assembly according to claim 1, wherein the second end of the at least one light engine comprises a groove feature configured to be manually engaged by a user in extracting the at least one light engine from the at least one second connector.

13. A lamp assembly comprising:
- a body portion;
- a first connector mounted to the body portion, the first connector comprising a first electromechanical interface configured to both:
  - electrically connect a light engine hosted by the lamp assembly to a power supply; and
  - provide a first mechanical connection of the light engine to the lamp assembly; and
- a second connector mounted to the body portion, the second connector comprising a mechanical interface configured to provide a second mechanical connection of the light engine to the lamp assembly, wherein the second connector is not configured for electrical connection, and wherein the second connector is configured to transition between:
  - a first state in which the light engine is installable and removable from the second connector; and
  - a second state in which the light engine is prevented from installation and removal from the second connector.

14. The lamp assembly according to claim 13, further comprising the light engine, wherein the light engine comprises:
- a printed circuit board having a second electromechanical interface configured to be electrically and mechanically connected with the first electromechanical interface of the first connector; and
- at least one light-emitting diode (LED) populated on the printed circuit board.

15. The lamp assembly according to claim 14, wherein in being configured to be electrically and mechanically connected with the first electromechanical interface:
- the second electromechanical interface is configured as one of a socket and plug; and
- the first electromechanical interface is configured as the other of a socket and plug.

16. The lamp assembly according to claim 14, wherein the first electromechanical interface is configured to receive and retain at least a portion of the second electromechanical interface inserted therein.

17. The lamp assembly according to claim 13, wherein the mechanical interface of the second connector comprises a movable lock latch which is configured to transition between the first state and the second state.

18. The lamp assembly according to claim 17, wherein the movable lock latch is configured to physically interface with a printed circuit board of the light engine.

19. The lamp assembly according to claim 13, wherein at least one of the first connector and the second connector further comprises a housing including at least one fixing element comprising at least one of a spring and an elastic component.

20. The lamp assembly according to claim 13, wherein a mounting position of at least one of the first connector and the second connector with respect to the body portion is adjustable such that the at least one of the first connector and the second connector is arrangeable at different locations on the body portion.

* * * * *